US008850801B2

(12) United States Patent
Baig et al.

(10) Patent No.: US 8,850,801 B2
(45) Date of Patent: Oct. 7, 2014

(54) CATALYTIC CONVERTER AND MUFFLER

(71) Applicant: Caterpillar Inc., Peoria, IL (US)

(72) Inventors: Mirza P. Baig, Peoria, IL (US); Kevin J. Weiss, Peoria, IL (US); Raymond U. Isada, Peoria, IL (US); Stephan D. Roozenboom, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 73 days.

(21) Appl. No.: 13/749,756

(22) Filed: Jan. 25, 2013

(65) Prior Publication Data

US 2014/0208723 A1 Jul. 31, 2014

(51) Int. Cl.
*F01N 3/00* (2006.01)
*F01N 3/28* (2006.01)
*B01D 53/94* (2006.01)

(52) U.S. Cl.
CPC .......... *F01N 3/2885* (2013.01); *B01D 53/9431* (2013.01)
USPC .............................................. 60/295; 60/297

(58) Field of Classification Search
USPC ................................................... 60/295, 297
See application file for complete search history.

(56) References Cited

U.S. PATENT DOCUMENTS

| | | | |
|---|---|---|---|
| 5,043,147 A * | 8/1991 | Knight | 422/180 |
| 5,578,277 A | 11/1996 | White et al. | |
| 7,712,305 B2 | 5/2010 | Kapsos et al. | |
| 2003/0221424 A1* | 12/2003 | Woerner et al. | 60/297 |
| 2004/0178015 A1* | 9/2004 | Wiemeler et al. | 181/237 |
| 2006/0153748 A1* | 7/2006 | Huthwohl et al. | 422/172 |
| 2006/0156712 A1* | 7/2006 | Buhmann et al. | 60/297 |
| 2006/0266022 A1* | 11/2006 | Woerner et al. | 60/295 |
| 2007/0137188 A1* | 6/2007 | Ohya et al. | 60/311 |
| 2007/0193255 A1* | 8/2007 | Satou | 60/286 |
| 2009/0158721 A1* | 6/2009 | Wieland et al. | 60/297 |
| 2010/0212301 A1 | 8/2010 | De Rudder et al. | |
| 2010/0263352 A1 | 10/2010 | Hylands et al. | |
| 2010/0263354 A1 | 10/2010 | Sedlacek et al. | |
| 2011/0146252 A1 | 6/2011 | Silver et al. | |
| 2011/0146253 A1 | 6/2011 | Isada et al. | |

* cited by examiner

*Primary Examiner* — Thomas Denion
*Assistant Examiner* — Jason Shanske

(57) ABSTRACT

A catalytic converter and muffler including a housing having an inlet disposed between a first end and a second end of the housing to introduce exhaust gases into an inlet chamber. A plurality of first exhaust treatment banks disposed between the inlet and the first end of the housing to allow the exhaust gases flow towards the first end from the inlet chamber into an end chamber. A mixing tube to direct the exhaust gases towards the second end from the end chamber into a flow distributor and a plurality of second exhaust aftertreatment banks and flow into an outlet chamber. At least one resonator chamber defined within the housing to attenuate noise in the exhaust gases.

20 Claims, 5 Drawing Sheets

CATALYTIC CONVERTER AND MUFFLER

TECHNICAL FIELD

The present disclosure relates to a catalytic converter and muffler for treating exhaust gases and dissipating noise associated with the exhaust gases, and more particularly to a catalytic converter and muffler assembly arranged as a single unit.

BACKGROUND

Internal combustion engines, including diesel engines, gasoline engines, gaseous fuel-powered engines, and other engines known in the art, produce exhaust gases having a complex mixture of air pollutants. These air pollutants are composed of gaseous compounds including, among other things, oxides of nitrogen (NOx). In order to comply with the regulation of NOX, some engines employ a strategy called selective catalytic reduction (SCR). The SCR is an exhaust treatment process where a reductant, most commonly urea or a water/urea solution, is selectively injected into the exhaust gas stream of an engine and adsorbed onto a downstream substrate. The injected urea solution decomposes into ammonia which decomposes NOX in the exhaust gas into less harmful components.

The exhaust systems of the internal combustion engines may also be equipped with noise attenuation devices, such as mufflers. These noise attenuation devices reduce the intensity of the exhaust noise generated during the operation of the internal combustion engine. The noise attenuation devices are configured to reduce the noise level in the immediate vicinity of the engine.

U.S. Pat. No. 5,578,277 discloses a catalytic converter and muffler. The catalytic converter and muffler may be used to purify exhaust from a relatively large diesel engine. The device includes various structural components that are mounted in the exhaust flow path within a housing having an inlet and an outlet.

SUMMARY

In an aspect, the present disclosure provides a catalytic converter and muffler including a housing having an inlet disposed between a first end and a second end of the housing. The inlet may introduce exhaust gases into an inlet chamber. The catalytic converter and muffler may further include a plurality of first exhaust treatment banks disposed between the inlet and the first end of the housing and configured to allow the exhaust gases flow towards the first end of the housing, from the inlet chamber into an end chamber. Further, a mixing tube is provided to direct the exhaust gases towards the second end of the housing, from the end chamber into a flow distributor. A plurality of second exhaust aftertreatment banks disposed between the flow distributor and the second end of the housing to allow the exhaust gases flow towards the second end from the flow distributor into an outlet chamber. The catalytic converter and muffler may also include at least one resonator chamber defined within the housing which is configured to attenuate noise in the exhaust gases.

In yet another aspect, the present disclosure provides a method of treating exhaust gases using the catalytic converter and muffler. The method includes introducing the exhaust gases into an inlet chamber of the catalytic converter and muffler, via an inlet, along a substantially orthogonal direction with respect to a longitudinal axis of the catalytic converter and muffler. The exhaust gases may pass through a first exhaust treatment banks disposed between the inlet chamber and an end chamber of the catalytic converter and muffler in a first flow direction substantially along the longitudinal axis and also pass into a first resonator chamber. Subsequently, the method includes passing the exhaust gases through a second exhaust aftertreatment banks disposed between the inlet chamber and an outlet chamber and also pass the exhaust gases into a second resonator chamber.

Other features and aspects of this disclosure will be apparent from the following description and the accompanying drawings.

DETAILED DESCRIPTION

Figure 1:
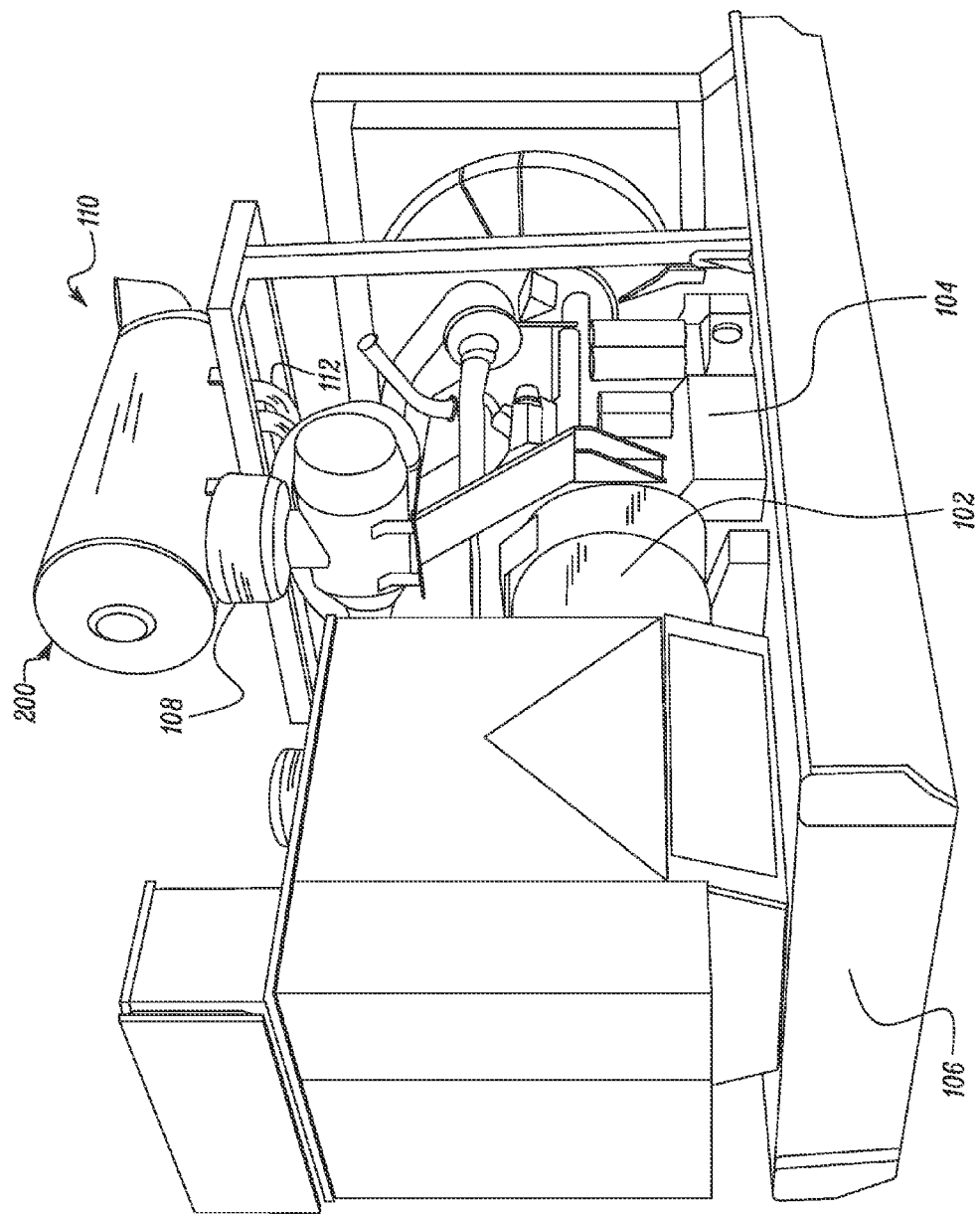
FIG. 1 is a perspective view of an exemplary power system.

The present disclosure will now be described in detail with reference being made to the accompanying figures. FIG. 1 shows an exemplary power system 100. For the purpose of the present disclosure, the power system 100 is depicted and described as a generator set including a generator 102 powered by an engine 104, such as an internal combustion engine. The generator 102 and the engine 104 may be supported by a frame 106. It may be contemplated that power system 100 may embody any type of power system, for example, one including a diesel engine, a gasoline engine, or gaseous fuel-powered engine, and may be associated with a mobile machine such as a vehicle/locomotive, or a stationary machine such as a pump.

It may be apparent that the power system 100 may include multiple sub-systems to work in conjunction with the engine 104. For example, the power system 100 may include, among other things, an air induction system 108 and an exhaust system 110. The air induction system 108 and the exhaust system 110 may be mechanically coupled to the frame 106. The air induction system 108 may be configured to direct air or an air-fuel mixture into the engine 104, for subsequent combustion. The exhaust system 110 may be configured to treat and discharge byproducts of the combustion from the engine 104 to the atmosphere.

The exhaust system 110 may include components to direct exhaust gases from the engine 104 to the atmosphere. For example, the exhaust system 110 may include one or more exhaust pipes 112 connected to the engine 104. Further, the exhaust system 110 of the present disclosure includes a catalytic converter and muffler 200 to treat exhaust gases. The catalytic converter and muffler 200 may be connected to the exhaust pipes 112 to receive the exhaust gases. The catalytic converter and muffler 200 may treat, condition, and/or otherwise reduce constituents of the exhaust gases before the exhaust gases are discharged to the atmosphere.

Figure 2:
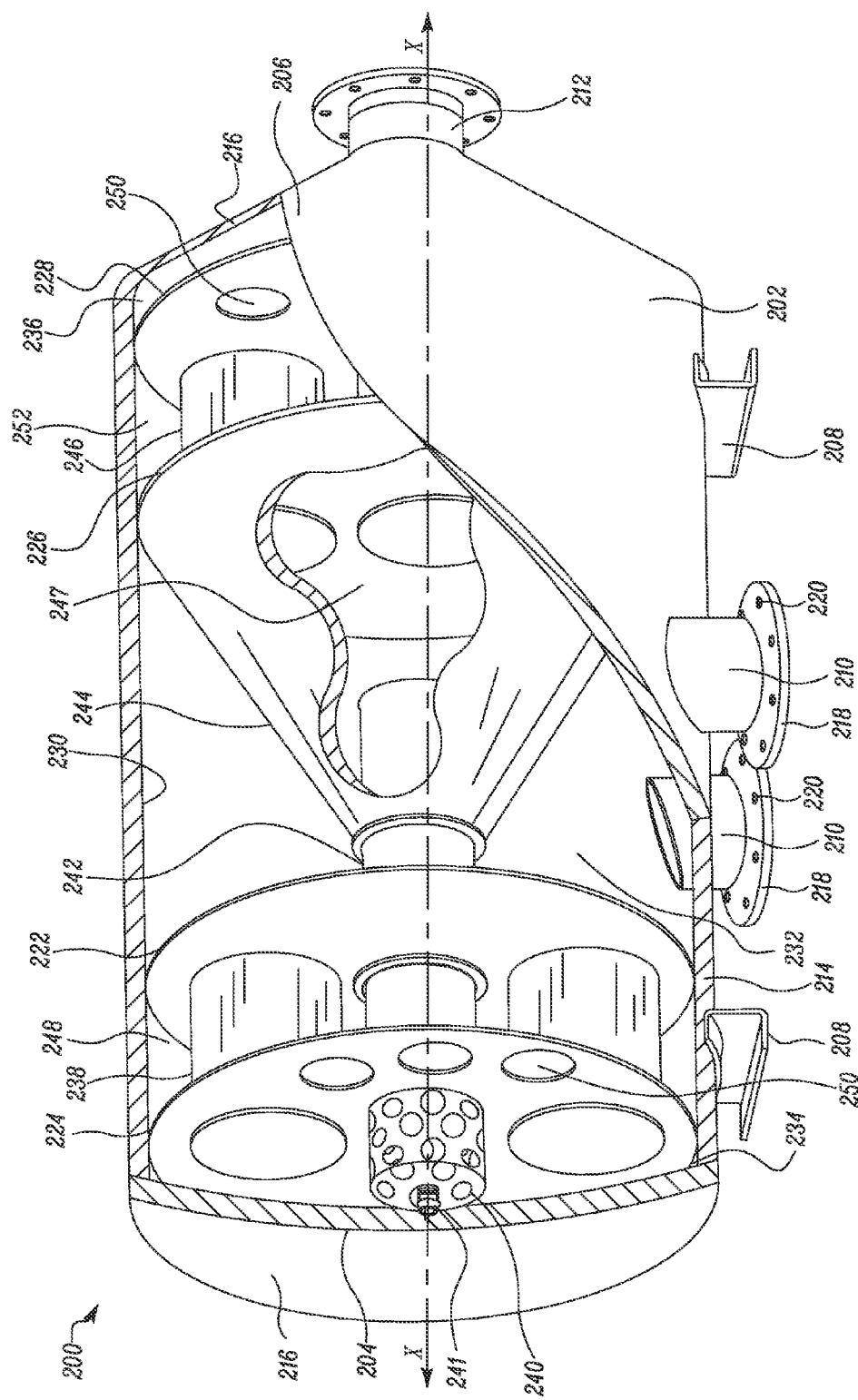
FIG. 2 illustrates a cutaway perspective view of a catalytic converter and muffler including an inner structure, in accordance with an aspect of the present disclosure.

FIG. 2 illustrates the catalytic converter and muffler 200, in accordance with an embodiment of the present disclosure. The catalytic converter and muffler 200 includes a housing 202. In FIG. 2, a portion of the housing 202 is removed for illustration purposes to show the inner structure of the catalytic converter and muffler 200. According to an embodiment, the housing 202 may have a substantially cylindrical shape extending along a longitudinal axis X between a first end 204 and a second end 206. The housing 202 may be in an order of about 30 to 50 inches in diameter, and about 70 to 100 inches in length. Further, the housing 202 may be manufactured from metal alloys such as stainless steel or similar material having an appropriate thickness.

[Query for Inventors: Please Confirm the Dimensions of the Catalytic Converter and Muffler 200]

The housing 202, of the catalytic converter and muffler 200, may be rigidly fixed on the frame 106 of the power system 100 by using fasteners, or other joining means such as welding. Further, the frame 106 may provide provisions to allow a relative thermal expansion of the housing 202, when the housing 202 is exposed to elevated temperatures. In the illustrated embodiment, the housing 202 may be fixed to the frame 106 at base supports 208 by suitable joining means known in the art. The base supports 208 may help to reduce induced vibrations from the frame 106, and thus protects various components mounted within the housing 202.

The catalytic converter and muffler 200 may include at least one inlet 210 and an outlet 212 provided in the housing 202. During operation, the exhaust gases from the engine 104 may enter within the housing 202 via the inlets 210, flow through the housing 202 and exit at the outlet 212. In the illustrated embodiment, the catalytic converter and muffler 200 includes two inlets 210 disposed on a lateral wall 214 and located substantially between the first end 204 and the second end 206 of the housing 202. Further, the outlet 212 is disposed on a sidewall 216 at the second end 206 of the housing 202. The inlets 210 and the outlet 212 may have substantially tubular shapes protruding outward from the housing 202. Alternatively, any number of inlets 210 and outlets 212 may be provided in the housing 202 to maintain a sufficient flow rate of the exhaust gases in the exhaust system 110. The inlets 210 and the outlet 212 may be connected to the exhaust pipes 112, using a conventional nut and bolt assembly or any other known methods, to receive and discharge the exhaust gases, respectively. As illustrated, the inlets 210 and the outlet 212 may be provided with respective flanges 218 having a plurality of bolt openings 220 for the purpose of connection to other exhaust components such as the exhaust pipes 112.

In one embodiment, the housing 202 may support a first plate 222 and a second plate 224 disposed further towards the first end 204 of the housing 202. Specifically, the first plate 222 and the second plate 224 may be disposed between the inlets 210 and the first end 204 of the housing 202. Likewise, the housing 202 may also support a third plate 226 and a fourth plate 228 disposed further towards the second end 206 of the housing 202 between the inlets 210 and the second end 206 of the housing 202. It may be contemplated that the plates 222, 224, 226, and 228 may be attached to an inner surface 230 of the housing 202 along their respective peripheral edges by welding or other well know joining processes. In addition, the plates 222, 224, 226, and 228 may be attached via brackets (not shown) in an effort to limit vibrations transmitted to the plates 222, 224, 226, and 228 due to the pulsating nature of the exhaust gases.

As illustrated, the housing 202 includes an inlet chamber 232 defined by the first plate 222 and the third plate 226, an end chamber 234 defined by the second plate 224 and the sidewall 216 at the first end 204, and an outlet chamber 236 defined by the fourth plate 228 and the sidewall 216 at the second end 206. In the present embodiment, the inlets 210 may be configured to allow the exhaust gases to enter within the inlet chamber 232 along a substantially orthogonal direction with respect to the longitudinal axis X of the housing 202. Further, the outlet 212 may allow the exhaust gases collected in the outlet chamber 236 to exit the housing 202.

According to an embodiment, the catalytic converter and muffler 200 includes a plurality of first exhaust treatment banks (of catalysts) 238 disposed between the inlets 210 and the first end 204 of the housing 202. In the illustrated embodiment, two first exhaust treatment banks 238 are arranged in a diametrically opposite pattern and supported by the first and the second plates 222, 224. However, based on the application and size of the engine 104, any number of the first exhaust treatment banks 238 may be arranged between the inlets 210 and the first end 204 of the housing 202. In an embodiment, the first exhaust treatment banks 238 may be tubular shaped sub-cans defining a plurality of individual flow-paths configured to allow the exhaust gases flow towards the first end 204 from the inlet chamber 232 into the end chamber 234. Moreover, the flow-paths through each of the first exhaust treatment banks 238 are substantially equal such that the exhaust gases are uniformly exposed to a catalyst present in the first exhaust treatment banks 238.

Each of the first exhaust treatment banks 238 may hold a cylindrically shaped substrate having a coating of an oxidation catalyst, such as a diesel oxidation catalyst (DOC) and/or a DeNOX catalyst. In one exemplary embodiment, the substrate may be ceramic, although alternative exemplary embodiments may also include configurations utilizing various metallic substrates. The substrate may have a porous ceramic honeycomb structure, a metal mesh, metallic or ceramic foam, or another suitable substrate coated with or otherwise containing the oxidation catalyst. The substrate may be coated with a variety of other compounds known in the art to promote the burning/trapping of various undesirable compounds present in the exhaust gases. For example, the oxidation catalysts may alternatively or additionally perform particulate trapping functions, hydro-carbon reduction functions, carbon-monoxide reduction functions, and/or other functions known in the art.

The catalytic converter and muffler 200 may include a diffuser 240 disposed within the end chamber 234 and supported by the side wall 216 at the first end 204 of the housing 202. The diffuser 240 may allow the exhaust gases in the end chamber 234 to converge in proximity to an injector 241. In an embodiment, the injector 241 may be an airless injector to introduce Diesel Exhaust Fluid (DEF) in the exhaust gases. The DEF is generally a reductant, such as anhydrous ammonia, aqueous ammonia, ammonium carbonate, ammine salt or aqueous urea solution, used to lower NOx concentration in the exhaust gases. A mixing tube 242 may be provided to receive the exhaust gases from the diffuser 240 and direct the exhaust gases towards the second end 206. The mixing tube 242 may allow the exhaust gases and the DEF to thoroughly mix and introduce the mixture in a flow distributer 244.

The flow distributor 244 may be suitably shaped to diverge the exhaust gases exiting the mixing tube 242 radially outward and direct toward the second end 206. In the illustrated embodiment, the flow distributor 244 is configured as one frustoconical channel connected the third plate 226, although any other geometry known in the art, such as, but not limited to, multiple frustoconical channels, spiral channels, may be utilized. However, the use of the single frustoconical flow distributor 244 may provide certain advantageous features, such as providing reduced backpressure, and simple construction/assembly. The flow distributor 244 may be configured to increase the velocity of the exhaust gases after mixing with the DEF in the mixing tube 242, and distribute the exhaust gases in a substantially uniform manner within a plurality of second exhaust aftertreatment banks 246, disposed along an inner face 247 of the third plate 226. For illustration purposes, a portion of the flow distributor 244 is removed to show the inner face 257 of the third plate 226 and the second exhaust aftertreatment banks 246.

The second exhaust aftertreatment banks 246 are supported between the third plate 226 and the fourth plate 228. Each of the second exhaust aftertreatment banks 246 may be substantially identical in shape, and size. Further, the second exhaust aftertreatment banks 246 may include a generally cylindrical substrate fabricated from or otherwise coated with an SCR catalyst, such as titanium oxide, a base metal oxide such as vanadium and tungsten, or any other catalytic element. The reductant entrained within the exhaust gases passing through the second exhaust aftertreatment banks 246 may be adsorbed onto the surface and/or absorbed within the SCR catalyst, where the reductant may react with NOx, typically, NO and NO2, in the exhaust gases to form water (H2O) and diatomic nitrogen (N2). After passing through the second exhaust aftertreatment banks 246, the exhaust gases enter the outlet chamber 236, from where the exhaust gases may exit the housing 202 via the outlet 212.

According to an embodiment of the present disclosure, the catalytic converter and muffler 200 includes a first resonator chamber 248 defined between the first and the second plates 222, 224 and located next to the end chamber 234 in the housing 202. The second plate 224 may include a plurality of openings 250 uniformly arranged in a predefined pattern, to allow the exhaust gases from the end chamber 234 to enter within the first resonator chambers 248. The first resonator chamber 248 may receive the exhaust gases from the end chamber 234 via the openings 250. It will be apparent to a person having ordinary skill in the art that, the exhaust gases may travel back and forth and reverberate within the first resonator chamber 248 to dissipate sound and achieve a desired level of noise attenuation.

Further, a second resonator chamber 252 may be defined between the third and the fourth plates 226, 228. The second resonator chamber 252 may be located next to the outlet chamber 236 to receive the exhaust gases therein. The fourth plate 228 may also include a plurality of openings 250 uniformly arranged in a predefined pattern, to allow the exhaust gases to enter within the second resonator chambers 252. As may be contemplated that the second resonator chamber 252 may receive the exhaust gases from the outlet chamber 236, via the openings 250 to achieve a desired level of noise attenuation.

Figure 3:
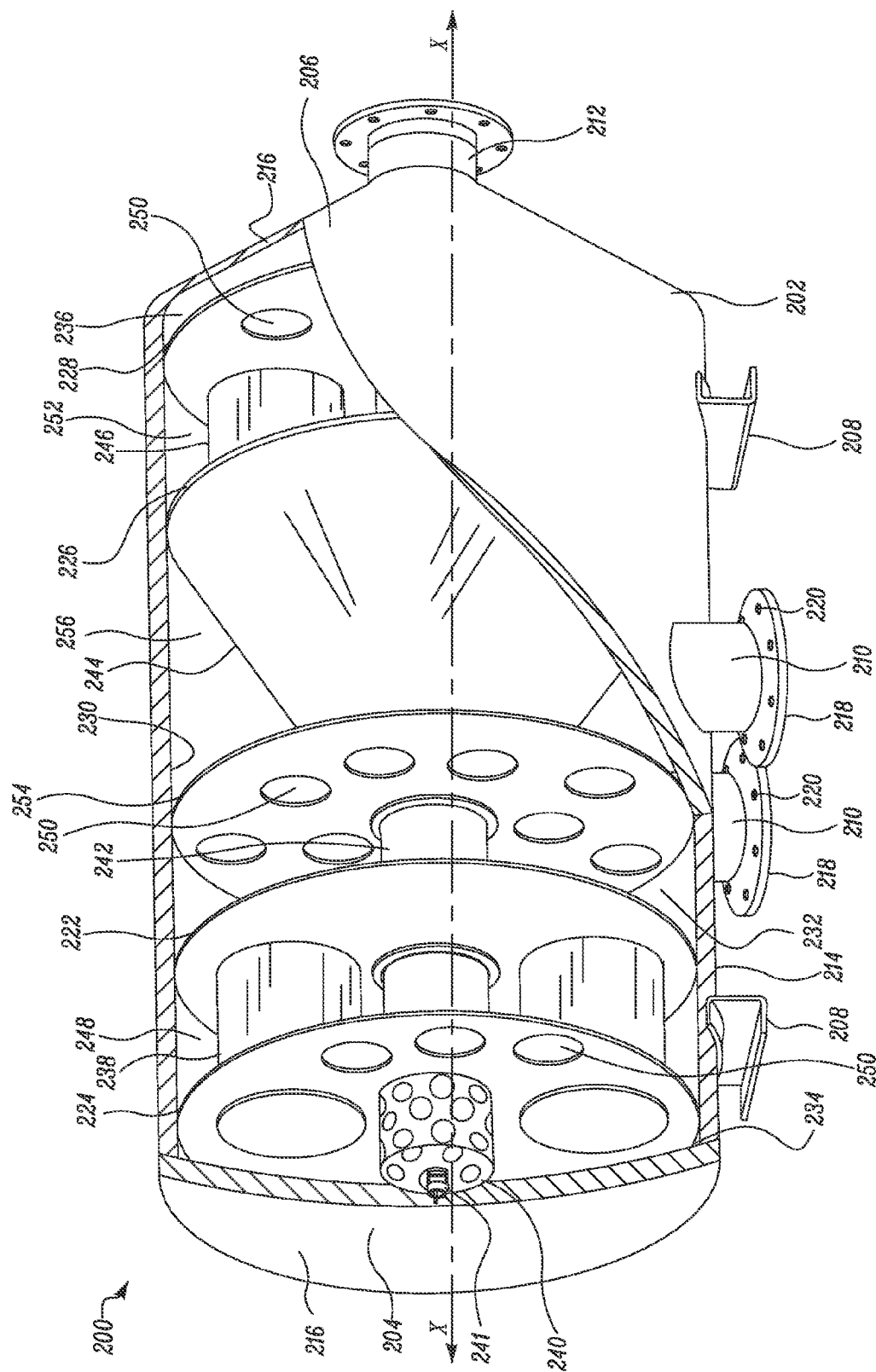
FIG. 3 illustrates a perspective view of a catalytic converter and muffler with partially showing the inner structure, in accordance with another aspect of the present disclosure.

In another exemplary embodiment, as illustrated in FIG. 3, the catalytic converter and muffler 200 may also include a fifth plate 254 positioned in the inlet chamber 232 between the inlets 210 and the first plate 222. The fifth plate 254, with openings 250, may define a third resonator chamber 256 with the third plate 226, for the exhaust entering the housing 202 from the inlets 210 and also aid in a uniform distribution of the exhaust gases through the first exhaust treatment banks 238. Further, the catalytic converter and muffler 200 may utilize other means such as using absorbent plates or porous materials, of varying density and composition, which convert sound energy into heat, and thus helps in noise attenuation.

INDUSTRIAL APPLICABILITY

The industrial applicability of a catalytic converter and muffler described herein will be readily appreciated from the foregoing discussion. Typically in an exhaust system, the use of catalytic convertor may cause problems in some situations. In particular, the catalytic convertor may restrict the exhaust gases flow to some extent and thereby cause an increase in the pressure of exhaust gases exiting an engine. If this exhaust back pressure is too high, the breathing ability and subsequent performance of the engine could be negatively impacted. As a general rule, increased back pressure results in lower fuel efficiency, decreased performance and a limited altitude range for a given engine.

Further, the exhaust systems of many internal combustion engines may also be equipped with noise attenuation devices, such as mufflers. The mufflers are typically located downstream of the catalytic converter to dissipate noise in the exhaust gases. Although mufflers may help reduce some noise from the power system 100, the inclusion of these serially-located devices often increases a size of the engine's exhaust system. The present disclosure provides the catalytic converter and muffler 200 which helps in purifying the exhaust gases and attains noise attenuation, as a single unit while providing a relatively compact packaging.

Referring to FIG. 1, the air induction system 108 may pressurize and supply air or a mixture of fuel and air into the cylinders of the engine 104 for subsequent combustion. The fuel and air mixture may be combusted by engine 104 to produce a mechanical rotation that drives the generator 102 and a flow of exhaust gases. The exhaust gases may contain a complex mixture of constituents, which may include, among other things, the oxides of nitrogen (NOx), such as NO and NO2.

The catalytic converter and muffler 200 of the present disclosure may be employed in a power system, such as the power system 100 described above. The exhaust gases, in the power system 100, are directed through the exhaust pipes 112 to the catalytic converter and muffler 200. The catalytic converter and muffler 200 may treat the exhaust before it is discharged to the atmosphere, and simultaneously attenuate the noise due to the flow of the exhaust in the power system 100. The components in the catalytic converter and muffler 200 may be so arranged that both the functional aspects are achieved, and still the overall size of the assembly may be smaller than using a separate catalytic convertor and a muffler arrangement. Therefore, the catalytic converter and muffler 200 may provide the advantages to be employed in the power systems with space constraints for packaging.

Figure 4:
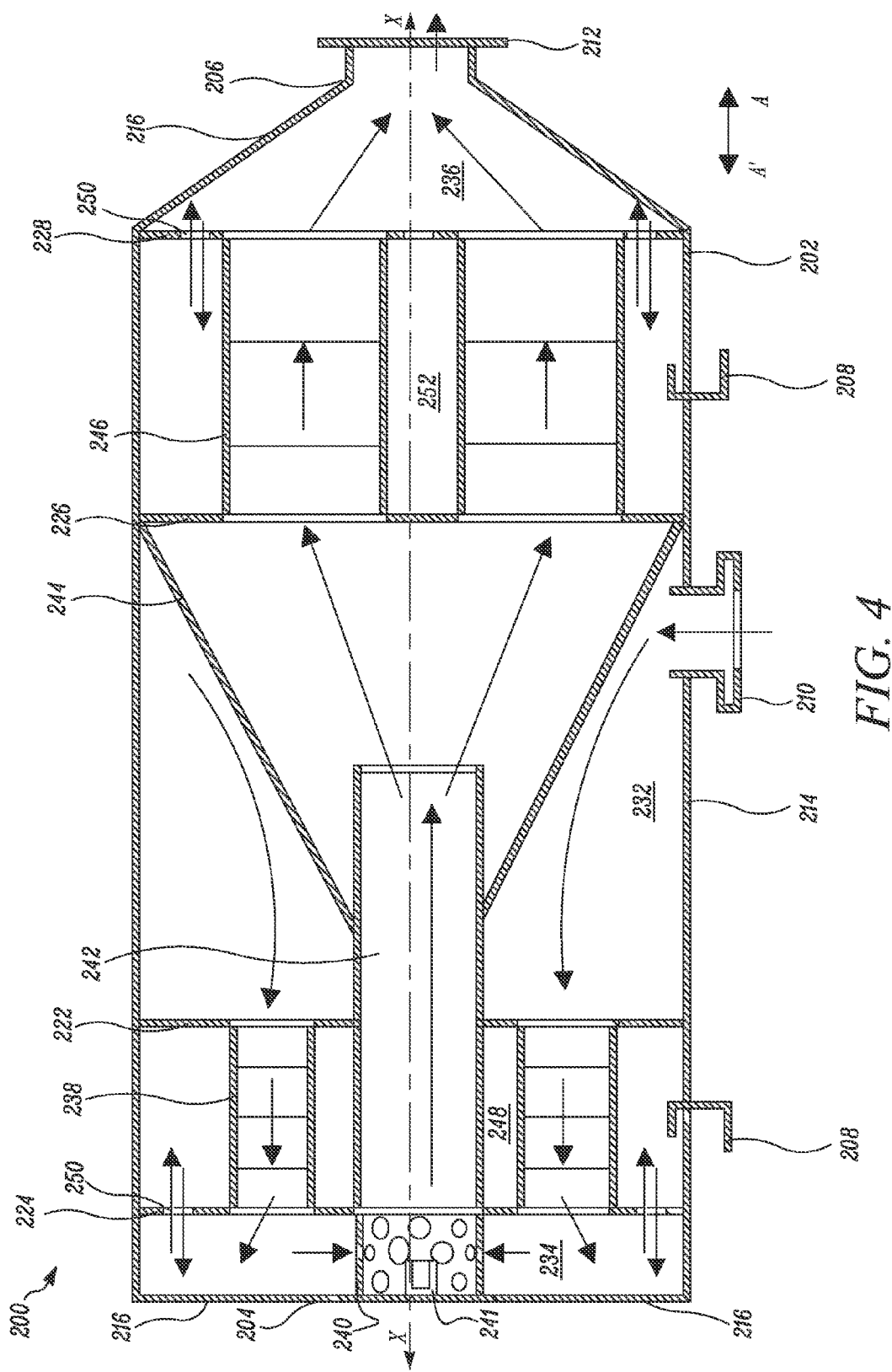
FIG. 4 illustrates a sectional view the exemplary embodiment of the catalytic converter and muffler of FIG. 2, depicting a flow path of exhaust inside the catalytic converter and muffler, in accordance with an aspect of the present disclosure.
Figure 5:
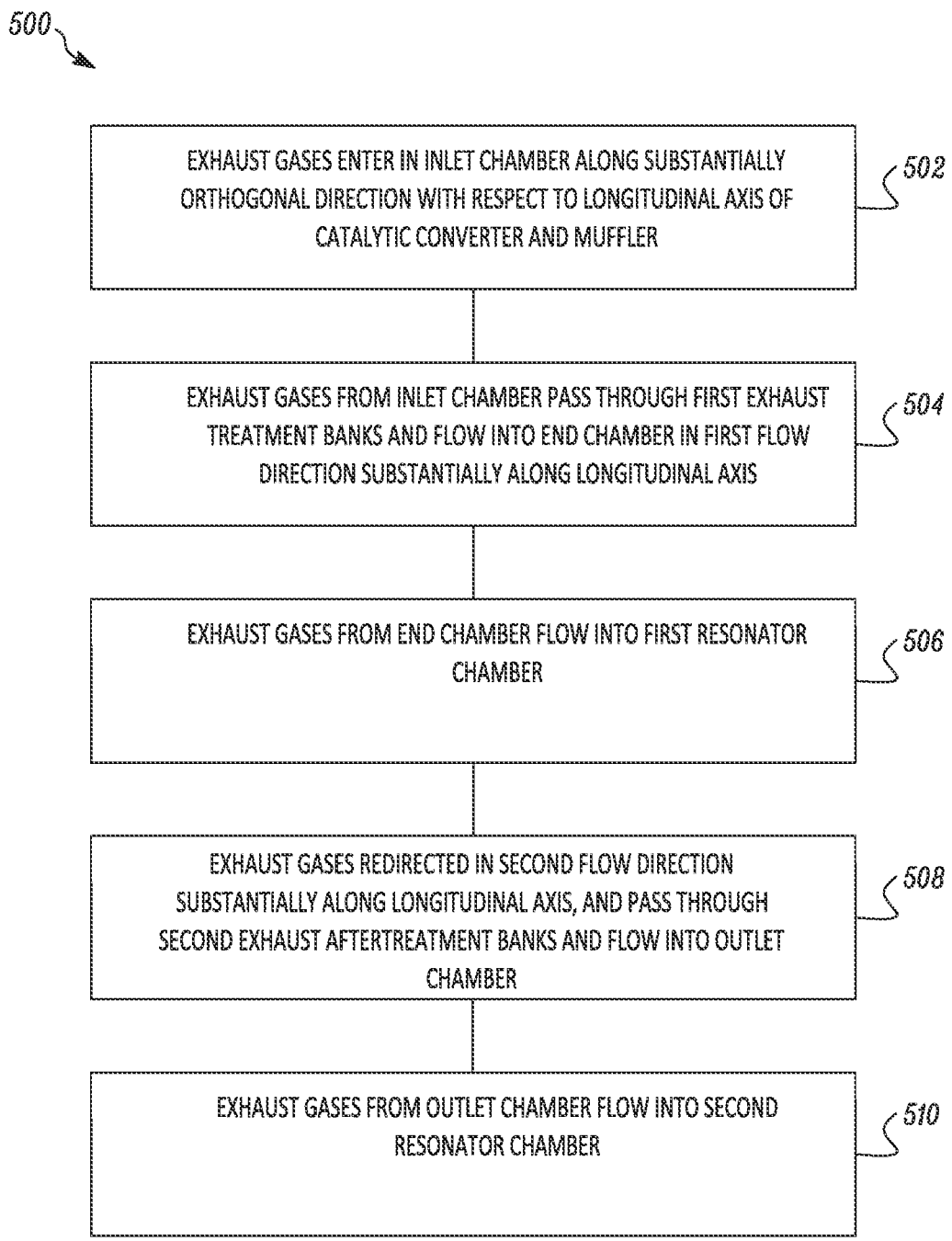
FIG. 5 is a process flow chart depicting steps for treating the exhaust gases using the catalytic converter and muffler, in accordance with an aspect of the present disclosure.

Furthermore, the working and advantages of the catalytic converter and muffler 200 are explained herein with reference to FIGS. 4 and 5 in conjunction. FIGS. 4 and 5 illustrate a sectional view of the catalytic converter and muffler 200, depicting a flow path of the exhaust gases (shown by arrows), and a process flow chart 500 for treating the exhaust gases, respectively, in accordance with an aspect of the present disclosure. As illustrated in FIG. 5, at step 502, the exhaust gases enter in the inlet chamber 232 of the catalytic converter and muffler 200 via the inlets 210 along the substantially orthogonal direction with respect to the longitudinal axis X (see FIG. 4). The exhaust gases from the inlet chamber 232 may follow the path along the flow distributor 244 towards the first end 204 of the housing 202, in a first flow direction AA' (see FIG. 4) substantially along the longitudinal axis X, and pass through the first exhaust treatment banks 238 of the oxidation catalyst and flow into the end chamber 234, at step 504. During this, the exhaust gases are exposed to the oxidation catalyst, and some of the NO in the exhaust gases may be converted to $NO_2$. Further, particulate matter, hydrocarbons, and/or carbon monoxide in the exhaust may also be trapped, converted, and/or reduced by the oxidation catalyst.

After passing through the first exhaust treatment banks 238, the exhaust gases in the end chamber 234 may flow into the first resonator chamber 248, through the openings 250 provided in the second plate 224, at step 506. As the exhaust gases pass through the first resonator chamber 248, the noise associated with the exhaust gases may reverberate therein and dissipate to some extent. Afterwards, the exhaust gases may converge near the injector 241, via the diffuser 240. The injector 241 may spray the reductant, such as the DEF, into the exhaust gases. Subsequently, at step 508 the exhaust gases may be redirected towards the second end 206 of the housing 202 via the mixing tube 242. The sudden change of direction may also provide some additional noise attenuation in the catalytic converter and muffler 200. In the mixing tube 242 due to the swirl and/or turbulence the exhaust gases thoroughly mix with the reductant. Subsequently, the exhaust gases, mixed with reductant, passes through the flow distributor 244 which may direct the exhaust gases radially-outward and towards the second end 206 of the housing 202, in a second flow direction NA (see FIG. 4) substantially along the longitudinal axis X, and pass through the second exhaust aftertreatment banks 246 of the SCR catalysts and flow into the outlet chamber 236. Because of an increasing area of the flow distributor 244, the exhaust gases may be forced through the second exhaust aftertreatment banks 246 in a substantially uniform manner. Further, as the exhaust gases passes through the second exhaust aftertreatment banks 246, NOx may react with the reductant in presence of the SCR catalysts, and be reduced to water and diatomic nitrogen.

At step 510, the exhaust gases may traverse from the outlet chamber 236 into the second resonator chamber 252, via the openings 250 in the fourth plate 228 to achieve further noise attenuation. Finally, the exhaust gases may be discharged via the outlet 212 into the atmosphere or into further aftertreatment components (not shown).

The catalytic converter and muffler 200 of the present disclosure may promote sufficient reductant decomposition and uniform exhaust distribution. For example, the mixing tube 242 may help mix the exhaust gases with the reductant through swirling and/or turbulence, and the length of mixing tube 242 and the flow distributor 244 may be sufficient for appropriate amounts of mixing and reductant decomposition. In addition, the flow distributor 244 may help to make the distribution of the exhaust gases across the second exhaust aftertreatment banks 246 more uniform.

The present catalytic converter and muffler 200 eliminates the need and undesirable effects of converging the flow between the catalytic converter and the muffler separately, which would otherwise be necessary for a catalytic converter mounted in a separate housing from the muffler. This flow convergence usually results in increased back pressure on the engine and decreases its efficiency. In the present disclosure, the integration of the catalytic converter with the muffler 200 in the single housing 202 is accomplished with a minimum sacrifice in the performance of the engine 104.

In addition, the parallel arrangement of the first exhaust treatment banks 238 and the second exhaust aftertreatment banks 246 may result in little restriction on the exhaust flow through the housing 202 of the catalytic converter and muffler 200, thereby further improving engine backpressure and performance. Further, the resonator chambers 248, 252 may make use of otherwise unused space in the housing 202 to dissipate noise. The simplicity and multi-use functionality of the components of the catalytic converter and muffler 200 may lower the cost thereof.

Although the embodiments of this disclosure as described herein may be incorporated without departing from the scope of the following claims, it will be apparent to a person skilled in the art that various modifications and variations to the above disclosure may be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. A catalytic converter and muffler comprising:
   a housing having a first end and a second end;
   an inlet disposed between the first end and the second end of the housing, the inlet configured to introduce exhaust gases into an inlet chamber;
   a plurality of first exhaust treatment banks disposed between the inlet and the first end of the housing, the first exhaust treatment banks configured to allow the exhaust gases to flow towards the first end from the inlet chamber into an end chamber;
   a mixing tube configured to direct the exhaust gases towards the second end from the end chamber into a flow distributor;
   a plurality of second exhaust aftertreatment banks disposed between the flow distributor and the second end of the housing, the second exhaust aftertreatment banks configured to allow the exhaust gases to flow towards the second end from the flow distributor into an outlet chamber; and
   at least one resonator chamber defined within the housing, the resonator chamber configured to attenuate noise in the exhaust gases.

2. The catalytic converter and muffler of claim 1, wherein the housing is cylindrical in shape.

3. The catalytic converter and muffler of claim 1, wherein the inlet is disposed on a lateral wall of the housing and an outlet is disposed on a sidewall of the housing.

4. The catalytic converter and muffler of claim 1 further comprising a first plate and a second plate disposed within, and substantially towards the first end of, the housing, wherein the first exhaust treatment banks are supported by the first and the second plates.

5. The catalytic converter and muffler of claim 4, wherein the at least one resonator chambers includes a first resonator chamber defined between the first plate and the second plate, wherein the second plate has at least one opening configured to introduce exhaust gases into the first resonator chamber.

6. The catalytic converter and muffler of claim 4 further comprising a third plate and a fourth plate disposed within, and substantially towards the second end of, the housing, wherein the second exhaust aftertreatment banks are supported by the third and the fourth plates.

7. The catalytic converter and muffler of claim 6, wherein the at least one resonator chambers includes a second resonator chamber defined between the third plate and the fourth plate, wherein the fourth plate has at least one opening configured to introduce exhaust gases into the second resonator chamber.

8. The catalytic converter and muffler of claim 6, wherein the flow distributor is a frustoconical channel disposed between the first plate and the third plate in the housing, wherein the flow distributor configured to distribute the exhaust gases over the second exhaust aftertreatment banks in a substantially uniform manner.

9. The catalytic converter and muffler of claim 1 further comprising a diffuser provided in the end chamber, wherein the diffuser is configured to converge the exhaust gases in proximity to an injector.

10. The catalytic converter and muffler of claim 9, wherein the injector is configured to introduce a reductant into the exhaust gases.

11. A power system comprising:
an engine;
an exhaust system in fluid communication with the engine, the exhaust system configured to discharge exhaust gases having by-products of combustion process in the engine; and
a catalytic converter and muffler including:
a housing having a first end and a second end;
an inlet disposed between the first end and the second end of the housing, the inlet configured to introduce exhaust gases into an inlet chamber;
a plurality of first exhaust treatment banks disposed between the inlet and the first end of the housing, the first exhaust treatment banks configured to allow the exhaust gases flow towards the first end from the inlet chamber into an end chamber;
a mixing tube configured to direct the exhaust gases towards the second end from the end chamber into a flow distributor;
a plurality of second exhaust aftertreatment banks disposed between the flow distributor and the second end of the housing, the second exhaust aftertreatment banks configured to allow the exhaust gases to flow towards the second end from the flow distributor into an outlet chamber; and
at least one resonator chamber defined within the housing, the resonator chamber configured to attenuate noise in the exhaust gases.

12. The power system of claim 11, wherein the housing is cylindrical in shape.

13. The power system of claim 11, wherein the inlet is disposed on a lateral wall of the housing and an outlet is disposed on a sidewall of the housing.

14. The power system of claim 11 further comprising a first plate and a second plate disposed within, and substantially towards the first end of, the housing, wherein the first exhaust treatment banks are supported by the first and the second plates.

15. The power system of claim 14, wherein the at least one resonator chambers includes a first resonator chamber defined between the first plate and the second plate, the second plate having at least one opening configured to introduce exhaust gases into the first resonator chamber.

16. The power system of claim 14 further comprising a third plate and a fourth plate disposed within, and substantially towards the second end of, the housing, wherein the second exhaust aftertreatment banks are supported by the third and the fourth plates.

17. The power system of claim 16, wherein the at least one resonator chambers includes a second resonator chamber defined between the third plate and the fourth plate, the fourth plate having at least one opening configured to introduce exhaust gases into the second resonator chamber.

18. The power system of claim 16, wherein the flow distributor is a frustoconical channel disposed between the first plate and the third plate in the housing, wherein the flow distributor is configured to distribute the exhaust gases over the second exhaust aftertreatment banks in a substantially uniform manner.

19. The power system of claim 11 further comprising an injector disposed at the first end of the housing, wherein the injector is configured to introduce a reductant into the exhaust gases.

20. A method of treating exhaust gases using a catalytic converter and muffler, the method comprising:
introducing the exhaust gases into an inlet chamber of the catalytic converter and muffler along a substantially orthogonal direction with respect to a longitudinal axis of the catalytic converter and muffler;
passing the exhaust gases through a first exhaust treatment bank disposed between the inlet chamber and an end chamber of the catalytic converter and muffler in a first flow direction substantially along the longitudinal axis;
passing the exhaust gases into a first resonator chamber;
passing the exhaust gases through a second exhaust aftertreatment bank disposed between the inlet and an outlet chamber of the catalytic converter and muffler in a second flow direction substantially opposite to the first flow direction; and
passing the exhaust gases into a second resonator chamber.

* * * * *